United States Patent [19]
Lechleider

[11] Patent Number: 5,511,119
[45] Date of Patent: Apr. 23, 1996

[54] METHOD AND SYSTEM FOR COMPENSATING FOR COUPLING BETWEEN CIRCUITS OF QUADED CABLE IN A TELECOMMUNICATION TRANSMISSION SYSTEM

[75] Inventor: Joseph W. Lechleider, Mendham Township, Morris County, N.J.

[73] Assignee: Bell Communications Research, Inc., Morristown, N.J.

[21] Appl. No.: 242,577

[22] Filed: May 13, 1994

Related U.S. Application Data

[63] Continuation-in-part of Ser. No. 15,950, Feb. 10, 1993, abandoned.

[51] Int. Cl.$^6$ ........................................... H04M 3/34
[52] U.S. Cl. .................... 379/414; 379/416; 379/417; 379/1; 379/24; 375/231; 375/232; 455/63
[58] Field of Search ............................. 379/1, 6, 24, 414, 379/415, 416, 417; 455/41, 63, 67.1, 67.3, 67.4; 375/12, 14

[56] References Cited

U.S. PATENT DOCUMENTS

| | | | |
|---|---|---|---|
| 3,614,622 | 10/1971 | Holsinger | 375/14 |
| 3,659,229 | 4/1972 | Milton | 333/18 |
| 3,678,379 | 7/1972 | Arvay et al. | 379/24 |
| 3,775,685 | 11/1973 | Eggimann et al. | 375/230 |
| 4,053,723 | 10/1977 | Arras et al. | 379/6 |
| 4,320,338 | 3/1982 | Morris et al. | 379/24 X |
| 4,346,367 | 8/1982 | Leinweber | 340/347 |
| 4,634,964 | 1/1987 | Chattler | 379/6 X |
| 4,715,064 | 12/1987 | Claessen | 379/392 |
| 4,995,104 | 2/1991 | Gitlin | 379/417 X |
| 5,181,198 | 1/1993 | Lechleider | 379/410 X |
| 5,214,675 | 5/1993 | Mueller et al. | 375/94 |
| 5,271,037 | 12/1993 | Szechenyi | 379/417 X |
| 5,295,159 | 3/1994 | Kerpez | 375/38 |

*Primary Examiner*—Jeffery Hofsass
*Assistant Examiner*—Scott L. Weaver
*Attorney, Agent, or Firm*—Leonard Charles Suchyta; James W. Falk

[57] ABSTRACT

In a quaded cable, coupling between circuits (side circuit 1, side circuit 2, and phantom circuit) is compensated for at the receiving end of a transmission system. By transmitting known signals from the transmission end separately on each circuit, coupling between circuits is initially estimated by measuring the signals received at the opposite end on each of the circuits. Following startup, during data transmission the received data signals are modified in accordance with this initially determined coupling between circuits to produce estimated transmitted data signals. During data transmission the coupling between circuits is reestimated by storing (303) N data signals received on each circuit and the corresponding N estimated transmitted data signals on each circuit. The coupling between circuits is determined as a function of the covariance of these N received signals on each circuit and the covariance of these N estimated transmitted data signals on each circuit. The reestimated coupling is then used to modify (302) newly received data signals on each of the circuits. The coupling between circuits is reestimated either after a new data signal is received on each circuit, or after a plurality of data signals are received on each circuit.

6 Claims, 2 Drawing Sheets

METHOD AND SYSTEM FOR COMPENSATING FOR COUPLING BETWEEN CIRCUITS OF QUADED CABLE IN A TELECOMMUNICATION TRANSMISSION SYSTEM

CROSS-REFERENCE TO RELATED APPLICATION

This is a continuation-in-part of Ser. No. 08/015,950, filed Feb. 10, 1993 and now abandoned.

TECHNICAL FIELD

This invention relates to methods and systems for compensating for coupling between circuits of quaded cable and, in particular, to methods and systems for compensating for coupling between such circuits in a telecommunication transmission system.

BACKGROUND OF THE INVENTION

Almost all North American telephone loop wire pair cable is multipair cable. These transmission circuits are formed by individually twisted pairs of copper wires that are stranded together. In contrast, much of the European and Asian cable plant is constituted of quaded cable or circuits. Some building cables in North America are also quaded. The elemental units in these cables are quads which are four insulated conductors or wires twisted together. The advantage of quading is that more circuits can be packed into a given cross-sectional area of cable. The disadvantage comes from the fact that the quad is geometrically unstable and the capacitances between the conductors in the quad are difficult to control. These factors lead to poorer crosstalk performance between circuits in the same quad.

Quaded cable can be made in two different configurations. In multiple twin quad, the two pairs that constitute the quad are individually twisted and then stranded together to effectively form a two-pair sub-unit. In star-quaded cable, the four conductors are twisted together. Most quaded cable is star-quaded. The cross-section of a typical star-quad is illustrated in FIG. 1A, which shows the four conductors, 1–4, surrounded by insulating sheathings 5–8, respectively. The natural modes of propagation of a perfectly constructed star-quad are obvious from the symmetry of the quad, and are illustrated in FIGS. 1B, 1C, 1D and 1E, where in each of these figures the insulating sheathings are not shown for improved clarity.

In an ideal star-quad, the two balanced pair modes, illustrated in FIGS. 1B and 1C, do not couple to each other because of the symmetry and opposite polarities of two opposite conductors of the quad. The balanced pair modes are frequently referred to as "side circuits," a terminology descended from the use of multiple twin quad. In side circuit one, a first signal is impressed positively and negatively between conductors 1 and 3, respectively, and in side circuit two, a second signal is impressed positively and negatively between conductors 4 and 2, respectively. Besides the balanced pair modes, one could use the phantom circuit of the balanced pair modes as shown in FIG. 1D to transmit a third signal. In the phantom circuit, the third signal is impressed "on-top" of the signals on side circuits one and two, positively and negatively between conductors 1 and 3 together, and conductors 2 and 4 together, respectively. An additional mode of transmission, the ground mode, is shown in FIG. 1E. In this mode a signal is positively impressed on top of all other signals between all four conductors together and an external ground. This mode is not used for transmission because of strong coupling to ground modes in other conductors within the same cable.

The polarities of the voltages on the four conductors guarantees that there would be no coupling between the phantom mode and the side circuits in a perfectly constructed star-quad. Thus, in such a quad, one would get three transmission circuits with tour conductors. As far as coupling between quads is concerned, coupling between side circuits in different quads would be like dipole-dipole coupling as it is in multipair cables. Coupling between phantom circuits would be quadripole-quadripole coupling, which is generally looser than dipole-dipole coupling.

Unfortunately, it is essentially impossible to achieve the precision and stability of the quad structure to take advantage of the mode structure. The mechanical instability of the quad structure leads to coupling between circuits in the same quad. At high frequencies the coupling or cross-talk between conductors can be at unacceptable levels. The far end coupling, the coupling at the receive end of the cable, generated by the signal induced at the transmitted end, increases by 20 dB per decade. Further, the near end coupling induced on the transmitter by the transmitted signals increases by 15 dB per decade.

Consequently, phantom circuits are never used and side circuits in quaded cable have a shorter range than twisted pairs at the higher frequencies used in modern services, such as Basic Rate ISDN.

SUMMARY OF THE INVENTION

An object of the present invention is to provide a method and system for compensating for coupling between the circuits of a quad, such as a star-quad, so that all three circuits on such a quad can be used with essentially no noticeable coupling between them.

In accordance with the present invention the coupling between circuits in a quad is initially determined in a training period by transmitting sets of known signals on the quaded cable and measuring the signals received by a receiver at the opposite end of the cable. By transmitting signals on one circuit one at a time during the training period, the coupling from one circuit to another is measured at the receiver and a coupling matrix between transmitting and receiving end circuits is calculated. The inverse of this coupling matrix is then used as an operator on the received signals, to estimate the transmitted signals once actual data transmission begins. During data transmission, the coupling matrix is updated using the actual statistical data. Specifically, after plural sets of data signals from the three circuits are received and the transmitted signals are estimated using the initial estimate of the coupling matrix, the covariance matrices of these plural sets of received signals and estimated transmitted signals are calculated and used to determine a new estimate of the coupling matrix. The new coupling matrix is then used to estimate the next set of transmitted signals on the three circuits. Depending upon whether the transmission channel is rapidly changing, or moderately or slowly changing, the coupling matrix is updated either after each set of signals on these circuits is received, or periodically after plural sets of signals on these circuits are received.

BRIEF DESCRIPTION OF THE DRAWING

FIG. 2 also illustrates this same mechanism at the receiving end of the quad for coupling signals from the first and second side circuits and fronn the phantom circuit.

DETAILED DESCRIPTION

Figure 1A:
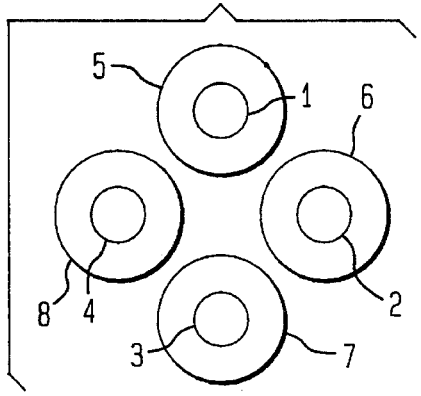
FIG. 1A is a cross-sectional view of a typical star-quad.
Figure 1B:
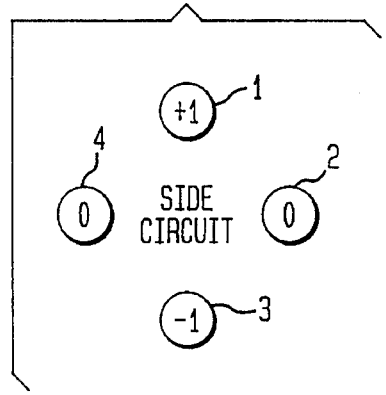
FIG. 1B is a cross-sectional view of side circuit one in such a star-quad wherein conductors 2 and 4 are at ground and conductors 1 and 3 are at +1 and −1 volts, respectively.
Figure 1C:
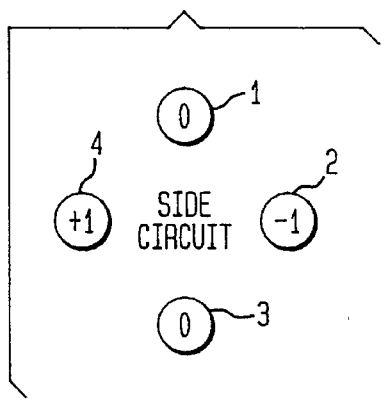
FIG. 1C is a cross-sectional view of side circuit two wherein conductors 1 and 3 are at ground and conductors 2 and 4 are at −1 and +1 volts, respectively.
Figure 1D:
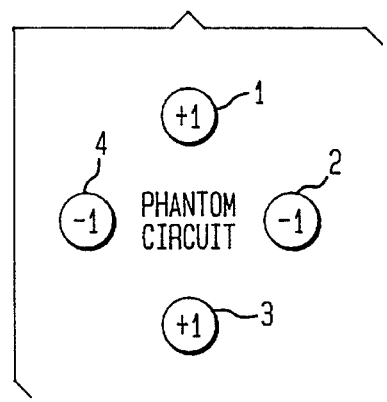
FIG. 1D is a cross-sectional view of a phantom circuit of such a cable wherein conductors 1, 2, 3 and 4 are at +1, −1, +1 and −1 volts, respectively.
Figure 1E:
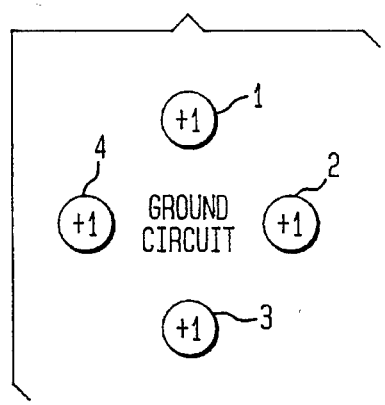
FIG. 1E is a cross-sectional view of a ground mode circuit wherein conductors 1–4 are all at +1 volts.
Figure 2:
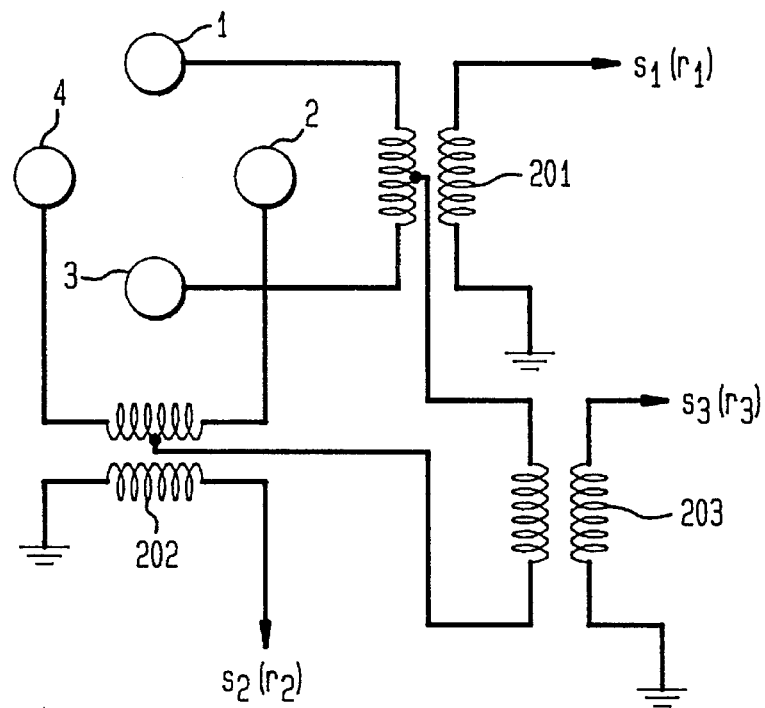
FIG. 2 is a diagram that illustrates a mechanism at the transmitting end of the quad for coupling signals to the first and second side circuits and to the phantom circuit.

With reference to FIG. 2, one end of a quad shows the four conductors 1, 2, 3 and 4. At the transmitting end of the quad, three signals, {Si}, i=1–3, are shown coupled through the primary and secondary windings of a coil to the two side circuits and to the phantom circuit; the side circuits and the phantom circuit are the operative modes of the quad. Thus, the first signal, S1, is coupled through coil 201 to side circuit one across conductors 1 and 3; the second signal, S2, is coupled through coil 202 to side circuit two across conductors 2 and 4; and the third signal, S3, is coupled through coil 203 to the center taps of the secondary windings of coils 201 and 202 to the phantom circuit between conductors 1 and 3, together, and 2 and 4, together. By coupling the secondary winding of 203 to the center taps of the secondary windings of coils 201 and 202, the effects of the side circuit voltages are filtered, thus impressing $S_3$ "on top" of the signals on each of the side circuits.

At the receiving end, a configuration identical to that shown in FIG. 2 is used to couple the transmitted signals from the quad to a receiver (not shown). Thus, at the receiving end, three signals, {ri}, i=1–3, are coupled from the quad from the first side circuit, the second side circuit and the phantom circuit, respectively, as shown in FIG. 2. Because of the coupling between circuits, the received signals, {ri}, are not equal to the transmitted signals, {Si}. By measuring the coupling between circuits in accordance with the method and apparatus of the present invention, however, it is possible to compensate for the effects of this coupling between circuits. Thus, by "operating" on the received signal, {ri}, so as to remove the effects of cross-coupling between circuits, estimates of the transmitted signals, {Si}, can be calculated that are close to the actual transmitted signals, {Si}. All three circuits can therefore be used for transmission.

In the following sections the characteristic of nominal star quads are described as well as the mathematical derivation of the method of the present invention for adapting quad terminations to minimize coupling. The method of the present invention for startup using a transmitted training sequence and for then tracking coupling over time using statistical data are then presented.

Characteristics of Nominal Star Quads

Since a star-quad has four conductors, the voltage transfer matrix from one end of the quad (x=0) to the other (x=1) is a four by four matrix:

$$\begin{bmatrix} v_1(1) \\ v_2(1) \\ v_3(1) \\ v_4(1) \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \begin{bmatrix} v_1(0) \\ v_2(0) \\ v_3(0) \\ v_4(0) \end{bmatrix} \quad (1)$$

The voltages in (1) are with respect to a putative remote ground at voltage zero.

In a nominal quad configuration, there is perfect geometrical symmetry within the quad and with respect to ground. Consequently, the coefficients in the transfer matrix satisfy the following symmetry:

$$a_{i,\,(i+n)mod(4)} = a_{k,(k+n)mod(4)};\ 1 \leq \forall(i,\,k,\,n) \leq 4 \quad (2)$$

i.e., i, k, and n are arbitrary integers greater than zero but less than five.

Consequently, equation (1) may be written in the form:

$$\begin{bmatrix} v_1(1) \\ v_2(1) \\ v_3(1) \\ v_4(1) \end{bmatrix} = \begin{bmatrix} a & b & c & b \\ b & a & b & c \\ c & b & a & b \\ b & c & b & a \end{bmatrix} \begin{bmatrix} v_1(0) \\ v_2(0) \\ v_3(0) \\ v_4(0) \end{bmatrix} \quad (3)$$

where a, b, and c represent realized values of the coupling coefficients $\{a_{ij}\}$, e.g., in (3) the value of $a_{11}$ is a and the value of $a_{14}$ is b.

The natural modes, or eigenvectors of any uniform transmission line are those distributions of voltages among the conductors that are unaffected by transmission except that all voltages are multiplied by the same number that depends on the distance transmitted. These distributions are proportional to the eigenvectors of the transmission matrix of the transmission line. The natural modes or eigenvectors of the nominal quad are easy to identify because of the form of the matrix on the fight in equation (3). They are:

- The ground return mode, with all conductors at the same voltage, with an eigenvalue of a+2b+c.
- Two side circuits. One circuit has conductors two and four at ground, with conductors one and three at +1 and −1 volts, respectively. The other circuit has conductors one and three at ground, with conductors two and four at +1 and −1 volts, respectively. The eigenvalues of both of the side circuit modes is a−c.
- The phantom circuit. This mode has the four conductor voltages equal to +1, −1, +1, −1, respectively. The eigenvalue for this mode is a−2b+c.

The phantom circuit is usually the lossiest mode, and the ground return the least lossy. Since ground return modes in separate quads couple strongly to each other, they are never used for transmission, but are important to the theory of crosstalk coupling and inductive interference and impulse noise.

Adapting Quad Terminations To Minimize Coupling

Real quads are never nominal, but differ slightly from the nominal configurations as mentioned above. Thus, the side and phantom circuits of the quad will all be coupled loosely.

The method and system of the present invention can be used to minimize the coupling between the modes.

For example, the normalized eigenvectors (mode vectors) of the nominal quad may be called {ei}. Then, the transmitted voltage vector, i.e. the array of conductor voltages at the transmitter can be written in the form:

$$v = \sum_{i=1}^{4} S_i e_i \quad (4)$$

where the $\{S_i\}$ are the information voltages transmitted on the separate modes; e.g., $S_1$ is the information transmitted on side circuit 1, etc. If transmission effects are equalized, equation (4) also represents the received voltage vector except for the delay in transmission, which we may ignore for the purposes of our discussion. The ground mode is never used because ground modes in the same cable strongly couple to each other. Consequently, $S_4=0$. data. Of course, if the ground mode is not used, one of the $S_i$ would be zero. It is assumed, in writing equation (4), that the transmission effects have been equalized.

To extract the $i^{th}$ data value ($S_i$) from the received vector, one can use the orthogonality of the normalized eigenvectors:

$$S_i = e_i^t v \quad (5)$$

where $$e_i^T \quad (6)$$

is the transpose of $e_i$.

Of course, when the quad is not nominal, what is received is not $S_i$, but $r_i$, given by $$r_i = \sum_{j=1}^{4} C_{ij} S_j \quad (7)$$

where the $C_{ij}$ are unknown coupling constants. Since the ground mode is never transmitted, we may assume that $S_4=0$ as indicated above. Also, the ground mode output ($r_4$), will not be measured. This converts equation (7) into a set of three equations in three unknowns the $\{S_i\}$ for $i=1,2,3$, which may be written in matrix from as follows:

$$r = CS \quad (8)$$

with obvious definitions for r, C and S. Of course, r and S are now 3-vectors and C is a three by three matrix. One of the problems of an adaptive receiver for a quad is estimating the matrix C from measurements of r and a knowledge of the properties of S. It should be noted that the matrix C, defined in equation (8), which we may refer to as the coupling matrix, would be a unit matrix if there were no coupling between the nominal quad modes.

When the coupling is relatively loose, which is almost always the case, the diagonal elements in the coupling matrix, i.e., the $C_{ii}$, are close to one and the off-diagonal elements are ($C_{ij}$ for $i \neq j$) close to zero. In this case, one may advantageously write equation (8) in the form:

$$r = (E+B)S \quad (9)$$

where E is a unit matrix (each diagonal element is equal to one and each off-diagonal element is equal to zero) and B is small in the sense that it substantially reduces the magnitude of any vector that it operates on. It should be noted that the matrix B represents the small difference in the coupling matrix C from the ideal unit matrix E which is the coupling matrix for an ideal quad with uncoupled modes, that is due to the loose coupling among the quad modes. Thus B represents a perturbation in the coupling matrix from the ideal quad's coupling matrix. Consequently, B may be called the "perturbation matrix".

If one knew the cross-covariance of r and S, one could determine B and use this knowledge to cancel intermodal coupling. To see this, take the outer product of both sides of equation (8) with $S^T$ and take expected values to get:

$$E(rS^T) = (E+B)E(SS^T) \quad (10)$$

which could be solved for B if, $E(rS^T)$ were known (where E (;) indicates the mathematical expectation, or expected value, of the quantity between the parentheses). However, S is never known at the receiver unless a known sequence is being transmitted for training purposes so that $E(rS^T)$ cannot be obtained. However, one can write $E(rS^T)$ in terms of what is known at a receiver. To do this, take the outer product of both sides of equation (8) with $r^T$ and take expectations to get:

$$E(rr^T) = (E+B)E(Sr^T) \quad (11)$$

or equivalently, $$E(rr^T) = E(rS^T)(E+B^T) \quad (12)$$

Using the definition of $E(rS^T)$ from equation (10) on the right in equation (12) then yields:

$$E(rr^T) = (E+B)E(SS^T)(E+B^T) \quad (13)$$

This equation may be written in the form:

$$E(rr^T) - E(SS^T) = BE(SS^T) + E(SS^T)B^T + BE(SS^T)B^T \quad (14)$$

If this equation could be solved for B one would know the cable matrix C and would be able to make error free determination of the transmitted signal vectors. An approximate solution for equation (13) is easy to obtain. The clue to this is to note that, since B is small, the last term on the right in equation (13) is of second order in small quantities and may be neglected in obtaining an approximation, $B_0$ for B. Thus, $B_0$ is a solution of:

$$E(rr^T) - E(SS^T) = B_0 E(SS^T) + E(SS^T)B_0^T \quad (15)$$

and may hence be solved by standard methods.

The error, ($B-B_0$), between B and its approximant, $B_0$, is of second order in small quantities. To see this, equation (4) is subtracted from equation (13) to obtain:

$$(B_0-B)E(SS^T) + E(SS^T)BTO - BT = BE(SS^T)BT \quad (16)$$

Since $E(SS^T)$ is not slnall or singular and the right side of equation (15) is of second order in small quantities, so is ($B_0-B$). Hence, $B_0$ is a good approximation to B.

If we use $B_0$ to obtain an estimate, Ŝ, of the transmitted signal vector, one has:

$$r = (E+B_0)\hat{S} \quad (16A)$$

or, since $B_0$ is small, $$\hat{S} \approx (E-B_0)r \quad (17)$$

which is good to first order as a solution of equation (16). In a similar way, one could write:

$$S \approx (E-B)r \quad (18)$$

Subtracting equation (17) from equation (18) one gets:

$$S - \hat{S} = (B_0 - B)r \quad (19)$$

Since it has been shown that $(B_0 - B)$ is of second order in small quantities, equation (19) shows that the error in $\hat{S}$ is of the second order in small quantities.

If the first order estimate $B_0$ needs to be improved, successively better approximation can be obtained by converting equation (13) into an iteration equation, which uses an earlier estimate for B in the second order term on the extreme right in equation (13) to obtain a closer approximation. Thus, one may write:

$$E(rS^T) - E(SS^T) - B_{n-1}E(Ss^T)B_{n-1}{}^T = B_{n-1}{}^T = B_n E(Ss^T) + E(SS^T)B_n \quad (20)$$

If one sets $B_{-1}=0$, setting n=0 in equation (20) yields equation (14).

Startup and Tracking With a Training Sequence

One way to startup and adapt the receiver to changing quad characteristics is by use of known transmitted sequences, i.e. by transmitting prescribed sequences of vectors S and then measuring the resulting received vectors r at the receiver. This will be effective on quads because the rate of change of the quad's characteristics will be low compared to the data rate of the information being transmitted. The purpose of using the known sequences is so that the coupling matrix, C, can be detemfined at the receiver, which can then invert the coupling matrix and apply the inverse to equation (16) when the transmitted signal vector, S, is data rather than a known training vector. This would convert equation (8) to:

$$S = C^{-1}r \quad (21)$$

Since the coupling matrix is a three by three matrix, it is theoretically only necessary to transmit a known sequence of three linearly independent signal vectors. In practice, longer sequences may be used to overcome uncertainties in received data caused by transmission noise and equipment imprecision.

A particularly convenient set of three :known signal vectors to use are the three mode vectors, which we will call $\{S^j\}$. The components of any signal vector are the values of the voltages transmitted on each of the three quad modes that are used to communicate, i.e., $\{S_i\}$. The training vectors $\{S^j\}$ have components $S_j=1$ and the other components equal to zero, $S_k=0$, $k \neq j$. Consequently the components of the corresponding received vectors are the columns of the coupling matrix. E.g., when $S^1$ is sent, the components of the received vector, $r^1$, are $\{C_{j1}\}$. Since the coupling matrix is a three by three matrix, it is easily inverted using standard formulas in a processing chip.

A known transmitted sequence can be used at startup before any data is transmitted. It may also be used to track the changing coupling matrix during communication by inserting short known training sequences into the transmitted sequence at prearranged intervals. The procedure outlined above for adapting the receiver during startup or in tracking quad transmission characteristic changes is formalized in the following algorithm:

1. At the transmitter, set $S_1=1$ and $S_2=S_3=0$. At the receiver, measure the output vector $r=(C_{11}, C_{21}, C_{31})^T$. Store this data at the receiver.

2. At the transmitter, set $S_2=1$ and $S_1=S_3=0$. At the receiver, measure the output vector $r=(C_{12}, C_{22}, C_{32})^T$. Store this data at the receiver 3. At the transmitter, set $S_3=1$ and $S_1=S_2=0$. At the receiver, measure the output vector $r=(C_{13}, C_{23}, C_{33})^T$. Store this data at the receiver It may be necessary to repeat steps 1, 2 and 3 several times in a noisy environment to mitigate against the effects of the noise.

4. At the receiver, invert the matrix of $C_{ij}$'s.

5. Start data transmission. Apply the inverse of the coupling matrix, $C^{-1}$, to the received mode amplitude vectors, r, to eliminate coupling between the modes.

For tracking changes in the coupling characteristics, it is necessary to inject training periods in the data stream. This can be done in intervals where steps 1–5 are repeated, or it can be done by transmitting known signal vectors at prescribed intervals, as indicated in the following steps.

6. After N data symbols are transmitted, transmit $S^1$ and then resume data transmission. Upon reception of the resultant received vector, replace the oldest received data stored in the receiver corresponding to the transmission of $S^1$. Using the new stored data, update the value of $C^{-1}$ and resume data reception.

7. After N additional data symbols are transmitted, repeat the procedure in step 6, but with $S^2$ transmitted instead of $S^1$. Then, after transmitting another N data symbols, repeat step 6 with $S^3$ transmitted instead of $S^1$.

8. Return to step 6.

In this way, by a judicious choice of N, which depends on line conditions, changes in coupling between modes can be tracked.

Tracking Using Statistical Data

In some situations it may be undesirable to track coupling variations by using known transmitted sequences. In these cases, it is still preferable to startup using known training sequences. However, after data transmission is started, the receiver is adapted using the methods described hereinabove in the section entitled "Adapting Quad Terminations To Minimize Coupling". This section details an algorithm for using those methods.

1. Startup using the procedure outlined in the above algorithm (steps 1–4) using a training sequence to determine an initial coupling matrix and its inverse.

2. Start data transmission. For the first N received data vectors, use the initial estimate of the coupling matrix to determine estimates of the transmitted data. Store the sequence of received vectors (called r(n), where n indicates the position sequence). Also store the values of the corresponding data vector estimates, i(n), as determined by using the inverse of the coupling matrix calculated in step 1.

3. Form the products $r(n)r^T(n)$ and $\hat{S}(n)\hat{S}^T(n)$ and store them.

4. After N data symbols have been received estimate the covariance matrices of received and transmitted data vectors as follows:

$$E(rr^T) \approx \frac{1}{N} \sum_{n=1}^{N} r(n)r^T(n) \quad (22)$$

$$E(SS^T) \approx \frac{1}{N} \sum_{n=1}^{N} \hat{S}(n)\hat{S}^T(n) \quad (23)$$

5. After step 4 is complete, use equation (15) and the results of equations (22) and (23) to make an estimate, $B_0{}^N$, of the matrix $B_0$. $B_0{}^N$ is a three by three matrix with nine unknowns. Nine separate equations can be derived from the matrix equation (15), one equation per each element in the three by three matrix on each side of the "=" sign. The nine unknowns can be readily determined from these nine equations.

6. Use equation (17) to calculate the estimate of the (N+1)st transmitted data vector.

7. As each new received vector arrives, replace the oldest data in the storage with the newest data and repeat steps 3 through 6 for the updated data, thus continuously updating the estimate of $B_0$. As the estimate of $B_0$ is continuously update, the mathematical mechanism for estimating the transmitted data vector from the received data vector is updated.

The process described above is particularly useful on a rapidly changing channel. On a moderately changing channel, which is the more likely typical quad situation, step 7 may be replaced with step 7A:

7. Use the estimate of $B_0$, $B_0^N$, and equation (17) to estimate the next N transmitted data vectors, storing r(N+1) through r(2N), and $\hat{S}(N+1)$ through $\hat{S}(2N)$. Then use equations (22) and (23), summing from n=N+1 to n=2N, and equation (15) to make a new estimate, $B_0^{2N}$, of the matrix $B_0$, which is then used to estimate the next N transmitted data vectors. This step is then repeated every N received data vectors.

On an even more slowly varying channel the estimate of $B_0$ can be used to estimate P transmitted data vectors, where P is greater than N. The last N of each P received vectors and corresponding estimated transmitted data vectors are then stored and used to estimate a new $B_0$, which is then used to estimate the next P transmitted data vectors. In all variations of this method, N itself depends on how fast the channel changes and the general conditions of the system, including thermal noise.

Figure 3:
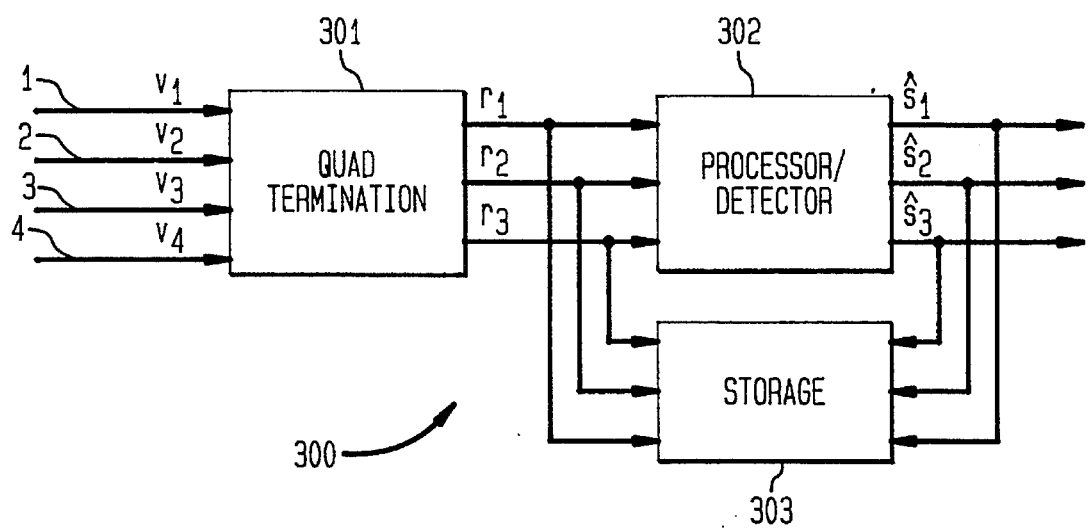
FIG. 3 is a block diagram of an adaptive quad receiver in accordance with the present invention which processes the signals coupled from the quad by compensating for the coupling between circuits as that coupling is determined first by sending test signals over the quad and then by adaptively tracking coupling variations in response to statistical data.

FIG. 3 shows a block diagram of an adaptive quad system 300 used for estimating transmitted data vectors from received vectors to compensate for cross-coupling between circuits. The quad conductors, 1–4, having voltages $v_1$–$v_4$ thereon, respectively, terminate in a quad termination 301. Quad termination 301, shown in FIG. 2, transforms the received voltages into received signals, $r_1$, $r_2$, and $r_3$, from the first, second, and phantom circuits of the quad, respectively. These received signals are input to a processor/detector 302, which detects these signals and processes them in accordance with the procedures described hereinabove to calculate estimates of the transmitted signals, $\hat{S}_1$, $\hat{S}_2$, and $\hat{S}_3$. Both the received signals and the estimated transmitted signals are input to a storage device 303, which stores the N last received and estimated signals and passes them to the processor for calculation of the covariance matrices (22) and (23). During the startup procedure, processor/detector 302 detects the received vectors for each of the three known transmitted vectors, as described in the startup procedure detailed above. The initial coupling matrix C and its inverse $C^{-1}$ are calculated and stored in storage 3()3. Receiver 300 then enters the adaptive stage and actual data is transmitted over the quad. Processor/detector 302 uses the initial estimate of the inverse of the coupling matrix, $C^{-1}$, to estimate the transn-fitted data from the received data. Then, as detailed in the tracking section above, the N received sets of signals and the N corresponding estimates of the transmitted signals in storage 303 are used by processor 302 to calculate the covariance matrices (22) and (23). Processor 302 then estimates $B_0^N$, which is then used to estimate the next transmitted signals from the received signals. As described in the section hereinabove, processor 302 updates its estimate of $B_0$ based on the last N received and estimated transmitted signals after each set of received signals, after every N sets of received signals, or after every P sets of received signals, depending upon whether the channel is rapidly changing, moderately changing, or slowly changing, respectively.

A relatively simple method and system has been described above for compensating for coupling between conductors in star-quaded cable. The method and system adaplively terminate star-quaded cable to substantially suppress coupling between nominal quad modes when there is loose coupling between them. An approximation method is described for estimating the transmitted signal using only information that is available at the receiver and is good to second order in small quantities when the coupling is of first order. Thus, for example, if the coupling between modes is down, say, 20 dB, the adaptive termination would suppress it so that it was down about 40 dB.

Obviously more elaborate adaptation procedures that require the transmission of information about received signal levels back to the transmitter, or the use of known training sequences, could reduce this error further.

While the best mode for carrying out the invention has been described in detail, those familiar with the art to which this invention relates will recognize various alternative designs and embodiments for practicing the invention as defined by the following claims.

What is claimed is:

1. In a telecommunications system including a cable having at least one quad having two side modes and one phantom mode, a method for compensating for coupling between the three modes of the quad, the method comprising the steps of:

during a start up training period, separately and successively transmitting at a transmitting end of the cable known training signals on each of said three modes of the quad;

measuring at an opposite receiving end of the cable the signals received on each of said three modes of the quad whose terminations are available at the receiving end of the cable, in response to the separate successive known training signals;

performing first estimations of the coupling between said three modes of the quad between the transmitting and the receiving ends of the cable from the measured training signals received on said three modes of the quad;

during transmission of data signals from the transmitting end on said three modes following the start up period modifying received data signals at the receiving end of the cable in accordance with the first estimations of the coupling between said three modes to produce estimated transmitted signals;

storing at least one of the received data signals from each said mode for signals received on each said mode and at least one corresponding estimated transmitted data signal as modified by one of said first estimations for said each mode;

performing subsequent estimations of the coupling between said three modes during transmission of subsequent data signals as a function of the stored at least one received data signal from said each mode and the stored at least one corresponding modified transmitted data signal for said each mode; and modifying said subsequent data signals received at the receiving end of the cable after performing said subsequent estimations of the coupling in accordance with said subsequent estimations of coupling between said three modes.

2. The method of claim 1 wherein the step of storing stores N received data signals on each said mode and N corresponding estimated transmitted data signals on each said mode, wherein N is greater than one, and the step of performing subsequent estimations of the coupling between said three modes includes the steps of estimating a covariance of received data signals from the stored N estimated data signals for said each mode.

3. The method of claim 1 wherein the step of storing stores N received data signals from each said mode and N corresponding estimated transmitted data signals for each said mode, wherein N is greater than one, and the step of performing subsequent estimations of the coupling between said three modes reestimates the coupling as a function of the stored N received data signals from each said mode and the stored corresponding estimated transmitted data signals for each said mode.

4. In a telecommunications transmission system including a cable providing communications channels and having at least a quad having two side modes and one phantom mode, a compensating system at a receiving end of the cable for compensating for coupling between said modes of the quad, the compensating system comprising:

means for receiving and measuring signals on each of said modes of the quad in response to known training signals transmitted separately and successively on each of the modes of the quad from a transmitting end of the cable to the receiving end;

means for estimating the coupling between said modes of the quad between the transmitting end and the receiving end of the cable from signals received and measured in response to the separately and successively transmitted known training signals on each of said modes of the quad during a start up period;

means for modifying received data signals from the modes of the quad in accordance with the estimated coupling between said modes of the quad to produce estimated transmitted data signals;

storage means for storing at least one received data signal from each of the modes of the quad and at least one corresponding estimated transmitted data signal for each of the modes of the quad;

means for performing subsequent estimations of the coupling between said modes of the quad during transmission of data signals as a function of the stored at least one received data signal from each mode of the quad and the stored at least one corresponding estimated transmitted data signal for each of the modes of the quad;

and means for modifying data signals from the modes of the quad in accordance with the subsequent estimates of the coupling between said modes of the quad.

5. The system in accordance with claim 3 wherein said storage means stores N received data signals from each of the modes of the quad and N corresponding estimated transmitted data signals for each of the modes of the quad, wherein N is greater than one, and said means for performing subsequent estimations of the coupling between said modes comprises means for estimating a covariance of received data signals from the stored N estimated transmitted data signals for each mode.

6. The system in accordance with claim 4 wherein said storage means stores N received data signals from each of the modes of the quad and N corresponding estimated transmitted data signals for each of the modes of the quad, and said means for performing subsequent estimations of the coupling between said modes reestimates the coupling as a function of the stored N received data signals from of the modes of the quad mode and the stored N corresponding estimated transmitted data signal for each of the modes of the quad.

\* \* \* \* \*

UNITED STATES PATENT AND TRADEMARK OFFICE
CERTIFICATE OF CORRECTION

PATENT NO. : 5,511,119
DATED      : April 23, 1996
INVENTOR(S): Joseph W. Lechleider It is certified that error appears in the above-identified patent and that said Letters Patent is hereby corrected as shown below:

Column 12, line 17, after "claim" change "3" to -- 4 --.
Column 12, line 33, after "from" insert -- each --.

Signed and Sealed this

Twenty-fifth Day of May, 1999

Attest:

Q. TODD DICKINSON

*Attesting Officer*     Acting Commissioner of Patents and Trademarks